Feb. 23, 1960     E. E. HANSON ET AL     2,925,804
VEHICLE POWER STEERING DEVICE
Filed May 6, 1955     2 Sheets-Sheet 2
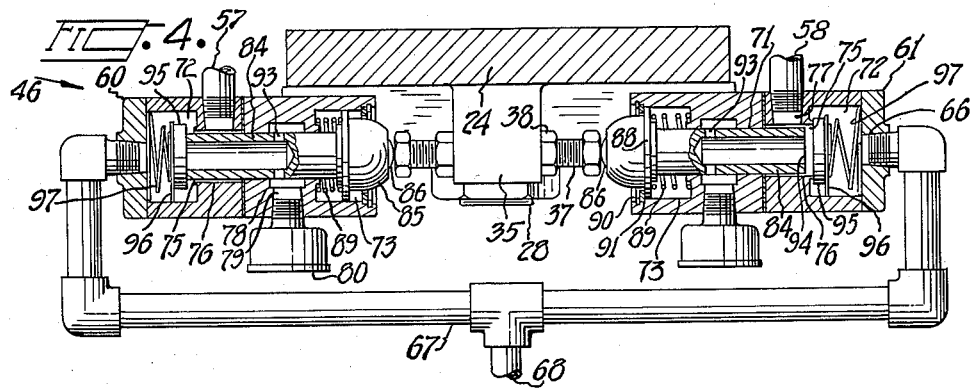
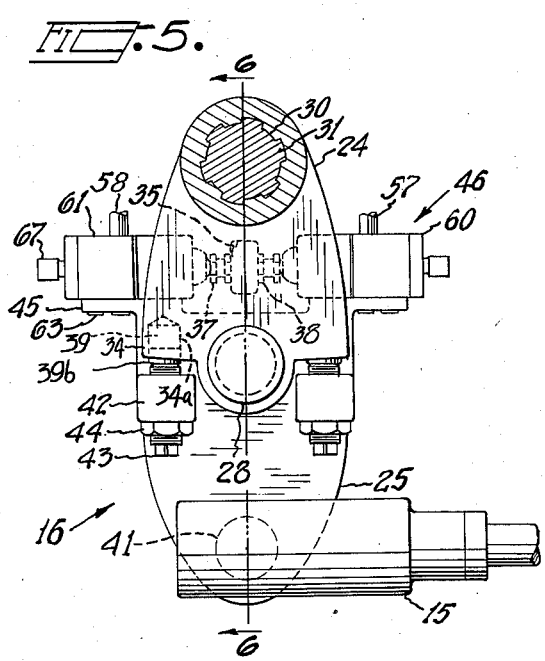
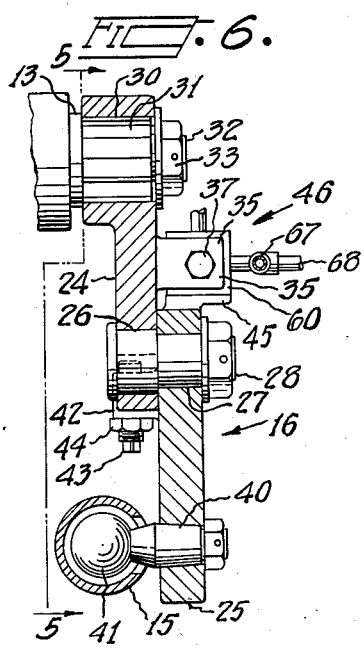
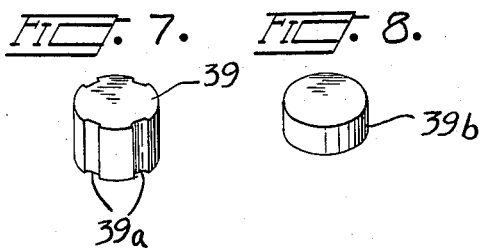
INVENTORS
EUGENE E. HANSON
ARTHUR R. DANIELS
BY
Cook and Schermerhorn
ATTORNEYS United States Patent Office 2,925,804
Patented Feb. 23, 1960

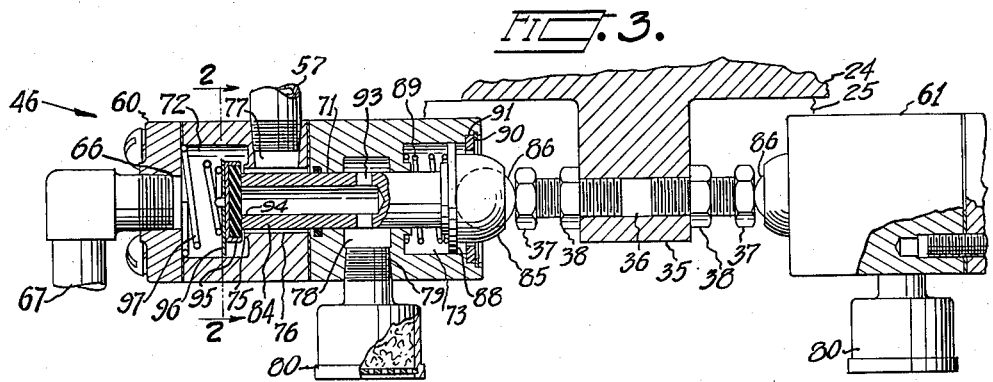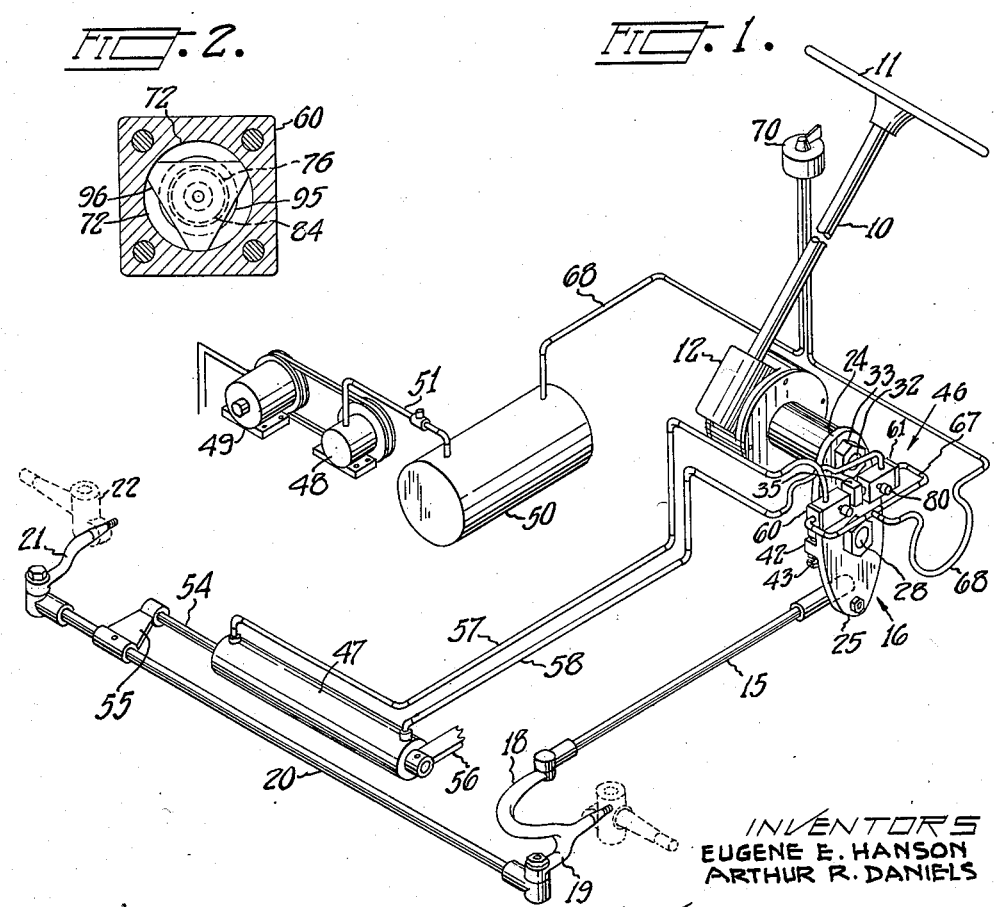

2,925,804

VEHICLE POWER STEERING DEVICE

Eugene E. Hanson and Arthur R. Daniels, Portland, Oreg., assignors to Monroe Auto Equipment Company, Monroe, Mich., a corporation of Michigan Application May 6, 1955, Serial No. 506,424

3 Claims. (Cl. 121—41)

This invention relates, in general, to fluid pressure power transmission and control, and more particularly to power steering apparatus incorporated in a manually operated system and responsive to operation of the manual system. The present invention is illustrated herein as applied to heavy vehicles such as trucks and busses, but may be utilized for steering or directing other equipment such as ordinary passenger automobiles, heavy road building equipment, ships, guns and turrets.

Conventional power steering equipment is generally of the hydraulic type and is expensive and difficult to install after the vehicle leaves the factory as it usually requires rather extensive modification of the manual steering system. Once installed it takes over the steering function with a very positive action which deprives the driver of the feel of the road to which he is accustomed. The steering assistance cannot be varied to meet different conditions but always responds to the limit of its power whether assistance is needed or not. Such characteristics are not desirable.

A principal object of the present invention is, therefore, to provide a new and improved fluid pressure power transmission and control.

A further object is to provide a steering system for vehicles employing novel manually operated apparatus for actuating a power component of the system.

A further object is to provide a pneumatic power transmission which may have a positive action, when desired, equivalent to an hydraulic system but without the disadvantages of an hydraulic system.

A further object is to provide a combined power and manual steering system employing a novel valve arrangement adapted to control a pneumatic servo-motor upon articulating movement of a manually operable portion of the steering system.

A further object is to provide a combined power and manual steering system employing an improved connection between articulate, manually operable members which is adapted to provide sufficient lost motion in the system to actuate power steering valves without imparting discernible looseness to the steering gear.

A still further object is to provide a combined power and manual steering system employing means readily accessible to the operator of the vehicle for controlling the amount of assistance furnished by the power system.

Further objects of the invention are to provide a power steering apparatus for vehicles which has a minimum number of operating parts to simplify manufacture and installation thereof, and which is readily adaptable for installation on existing vehicles without altering the steering column.

The above objects are accomplished by a power steering system which is mounted in a vehicle in conjunction with manual steering apparatus whereby the power means is responsive to operation of said manual steering apparatus to assist the vehicle operator in controlling the vehicle. The power system employs pressure supply means for actuating a servo-motor, and the control of the pressure supply to the servo-motor is accomplished by valve means mounted on and directly operated by a jointed pitman. The pitman comprises a pair of arms pivoted intermediate their ends which form a mechanical connection between the steering gear and the drag link assembly. The pitman has novel abutment means between its pair of arms and also has novel operating means for said valve means. In a ship steering gear the same result is accomplished by mounting the control valves on a jointed quadrant on the rudder post to which the steering cables are attached.

The invention will be better understood and additional objects and advantages will become apparent from the following description taken in connection with the accompanying drawings which illustrate a preferred form of the invention. It is to be understood, however, that the invention may take other forms, and that all such modifications and variations within the scope of the appended claims which will occur to persons skilled in the art are included in the invention.

In the drawings:

Figure 1 is a diagrammatic perspective view of the present steering system as applied to a heavy road vehicle, such as a truck;

Figure 2 is a sectional view taken on the line 2—2 of Figure 3;

Figure 3 is a fragmentary sectional view showing in detail the arrangement and structure of the valve means mounted on the jointed pitman shown in Figure 1;

Figure 4 is a sectional view of the valve means showing a different operative position thereof;

Figure 5 is an elevational view, partly in section, showing the structure of the jointed pitman;

Fig. 6 is a sectional view taken on the line 6—6 of Figure 5;

Figure 7 is a perspective view of a resilient plug member forming a portion of the abutment means between the jointed pitman arms; and Figure 8 is a perspective view of a metallic cap utilized with the plug member of Figure 7.

Referring to Figure 1, there is shown a steering shaft 10 having a steering wheel 11 secured to its upper end and terminating at its lower end in a steering gear housing 12. Although not shown in the present drawings, the steering shaft 10 generally carries a worm which meshes with a suitable gear on a cross shaft 13 projecting from one side of the housing 12. The cross shaft 13 in the present system is mechanically connected to a drag link assembly 15 by means of a jointed or articulated pitman or crank arm, designated generally by the numeral 16. Drag link assembly 15 is pivotally connected to a bell crank lever 18 having a tie rod arm 19. Tie rod arm 19 is connected with a tie rod 20 which is in turn connected with tie rod arm 21 on its opposite end. Tie rod arms 19 and 21 are connected with steering knuckles 22 which carry the dirigible or steerable road wheels (not shown).

The mechanical connection between the shaft 10 and the drag link 15 is accomplished through the intermediate connecting members, and upon rotation of the shaft 10 by means of manual twisting forces on the steering wheel 11 in a desired direction of rotation, the link 15 is moved longitudinally to deflect the steering wheels of the vehicle in a desired direction. By this arrangement, manual steering can be accomplished at all times, and such means is available although the power steering means, to be described, is for some reason rendered inoperative.

Referring in particular to Figures 1, 5 and 6, the pitman 16 comprises a pair of arms 24 and 25 which are partially overlapped and have bores 26 and 27, Figure 6, respectively, through such overlapped portions for receiving a pivot pin 28 whereby the two arms are adapted to pivot relative to each other. The arm 24 is provided with a splined bore 30 which receives a splined portion 31 of cross shaft 13, whereby a positive rotational connection is accomplished between the cross shaft 13 and the arm 24. Cross shaft 13 has a threaded end portion 32 for receiving a nut 33 to hold the arm 24 on the shaft. Arm 24 is provided with a lug 35 projecting outwardly from one surface thereof and having a threaded bore 36 therethrough, Figure 3. Threadedly mounted in the bore 36 and projecting on each side of the lug 35 is a screw 37 adapted to be locked in predetermined adjusted positions by a nut 38 thereon. Arm 25 is provided adjacent its lower end with a pin 40, Figure 6, having a ball end 41, by means of which the jointed pitman 16 is pivotally connected to the drag link 15. As best seen in Figure 5, the bottom edge of arm 24 is formed with a pair of spaced shoulders 34. Each of the shoulders 34 is provided with a bore 34a, shown in dotted lines, for receiving a resilient plug member 39, Figure 7, having vertical grooves 39a. A metallic cap 39b, which may or may not be secured to the plug 39, is also disposed in the bore 34a. Integral with the plate 25 is a pair of lugs 42 having threaded bores for receiving adjusting screws 43 having nuts 44 thereon for locking the screws 43 in predetermined set positions. In assembled position of the parts, the upper ends of pins 43 are adapted to engage the caps 39b, and rotative movement of the arm 24 will be transmitted to arm 25 through one of the resilient plug members 39. These plug members form resilient abutment means for limiting the articulated movement of the pitman arms 24 and 25, and the screws 43 are adjustable in the lugs 42 to vary the amount of articulated movement between the two arms. Screws 43 are preferably set up quite tightly against the caps 39b to compress the rubber plug 39 a sufficient amount so that in a steering operation the operator feels no lost motion in the manually operable parts. With the screws 43 so adjusted, each rubber plug 39 is distorted and a portion thereof flows into the tapered end portion of the bore 34a. Also, the plug is deformed radially into the vertical grooves 39a to some extent.

With the proper adjustment of screws 43 there is only a slight lost motion between the two arms 24 and 25 when the steering shaft is turned, due to the further deformation of one of the rubber plugs 39, but the operator cannot feel such lost motion in the manually operable parts. The plug 39 is preferably rubber because rubber so confined is capable of transmitting strong forces between the two arms with only slightly more deformation than that to which it is already subjected by the preloading adjustment of screws 43.

The pneumatic pressure means employed herein, which is adapted to assist the operator in deflecting the dirigible wheels of a vehicle, or the angular position of a rudder, gun or turret, and which is actuated by manual twisting forces applied to the directing mechanism, comprises, in general, a servo-motor control valve assembly 46, a servo-motor 47, and pneumatic supply means comprising an air compressor 48 driven by an electric motor 49 and an air storage tank 50 connected with the compressor 48 by means of a conduit 51.

Servo-motor 47 comprises a cylinder having a piston therein (not shown) connected to a piston rod 54 mechanically connected to the vehicle tie rod 20 by means of a bracket 55. Servo-motor 47 is mounted in a stationary position on the vehicle frame by means of a suitable bracket 56 and has conduits 57 and 58 connected therewith which lead to opposite ends of the cylinder and serve alternately as supply and discharge ducts for pneumatic actuation of the piston in either direction, although as will appear hereinafter each of the conduits 57 and 58 may simultaneously carry fluid pressure therein to provide pressure on both sides of the piston head and hold the tie rod 20 in a stable position free from longitudinal oscillatory movement.

The control valve assembly 46 comprises two identical valve units 60 and 61 secured to the flanges 45 of the arm 25 by means of screws 63, Figure 5. Each of the valves 60 and 61 has an end bore 66 for connection with branch line conduits 67 connected to a pneumatic supply conduit 68 from the air supply tank 50. Contained in the line 68 is a manual control valve 70 which is adapted to render the present power steering operative or inoperative, to the degree desired, the valve 70 preferably being located in the vehicle cab where it is available to the vehicle operator. This is a conventional air pressure regulating valve which prevents the pressure in cylinder 47 from rising above the value indicated by the valve setting.

Referring to Figures 3 and 4, each of the valves 60 and 61 has a central bore 71 and a pair of end counterbores or chambers 72 and 73. Each of valves 60 and 61 is also provided with an annular inlet channel or passageway 76 communicating with chamber 72 through an inlet port 75 and a bore 77 which receives one or the other of conduits 57 or 58 from the servo-motor. The valves also have an annular discharge channel or passageway 78. Conduits 57 and 58 from the servo-motor 47 communicate with the annular passageways 76 whereby, under certain conditions, air under pressure is permitted to pass from chamber 72 through port 75 to the conduits 57 or 58 through passageway 76 and bore 77. Annular discharge passageway 78 communicates with an outlet bore 79 in which is mounted a silencer cup 80.

Slidable in the bore 71 is a valve stem 84, tubular in structure, having a head portion 85 on one end thereof which houses a ball 86 projecting from the end thereof. Stem 84 has an annular flange or washer 88 engageable by a compression spring 89 which urges the stem 84 toward the lug 35. Valve stem 84 is limited in its movement toward the lug 35 by means of a removable stop 91 retained by a lock ring 90. Stem 84 has radial bores 93 which establish communication between the interior of the stem and the passageway 78 in all positions of the stem. Stem 84 further has an open end 94 constituting an outlet port for the servo-motor.

Disposed in the chamber 72 is a valve disc 95 secured on a triangularly shaped support 96, Figure 2. The disc 95 and its support are biased inwardly by a spring 97 and the disc is adapted either to close the open end of the stem 84 when the stem unseats the disc, as seen in valve 60 in Figure 4, or to seal off the inlet port 75 at the open ends of the bore 71 and the passageway 76, as seen in valve 61 in Figure 4. It is also possible for valve disc 95 to close both the inlet and outlet ports 75 and 94 simultaneously when stem 84 bears lightly against the disc without unseating it from the inlet port 75. In such position the disc produces a fluid lock condition in one end of cylinder 47 whereby fluid can neither enter nor leave that end of the cylinder.

The ball ends 86 of valve stems 84 engage the ends of screws 37, and the screws 37 are adjustable in the lug 35 to engage and hold the valve stems in desired positions, the valve stems being continually biased against screws 37 by the springs 89. Valve stems 84 are of a length such that upon a predetermined amount of longitudinal movement thereof, in a direction away from the opposite valve, the end thereof is adapted to engage and unseat the disc 95 from the end of passageway 76. Preferably, adjustment of screws 37 is maintained so that in a neutral position of the valve stems 84 each of the stems unseats or cracks its respective valve disc 95 slightly from inlet port 75 whereby pneumatic pressure is admitted to both conduits 57 and 58, and, therefore, air under equal pressure will be present on both sides of the servo-motor piston to assist in retaining the wheels in a steady, non-oscillatory position. The stems tend to assume such a neutral position of equilibrium at all times except when a twisting force is being applied to the steering wheel or to the dirigible road wheels.

Operation

Pneumatic pressure is admitted to the outer ends of the valves 60 and 61 by means of conduit 68 and branch conduits 67, and upon disengagement of one of the valve discs 95 from the end opening of bore 71 and annular passageway 76, as seen in the valve part 60 in Figure 4, air under pressure flows freely from chamber 72 into conduit 57 or 58 by means of annular channel 76 to actuate the piston in the servo-motor 46. When the disc 95 is disengaged from the end of its respective stem 84, as seen in valve housing 61 in Figure 4, air in servo-motor conduit 57 is released to discharge to atmosphere through the center of stem 84 and out bores 93, annular passageway 76, bore 79, and silencer cup 80.

Rotation of steering wheel 11 causes rotation of cross shaft 13 to "break" or articulate the jointed pitman 16, and the articulating movement of the arms 24 and 25 of the pitman 16 causes one of the screws 37 on lug 35 to exert a force on its valve head 85 sufficient to move the stem 84 longitudinally against compression of spring 89 to unseat further the valve disc 95 from inlet port 75 and allow air under pressure to flow freely from chamber 72 into one of the servo-motor conduits 57 or 58. The rate of movement of the piston is controlled in part by the throttling action of the valve disc when it is unseated only a slight amount. In this position of the parts the open end of the valve stem engages the disc 95 and tank pressure is prevented from escaping to atmosphere through the interior of the stem.

The other valve stem 84, being biased toward the lug 35, remains in engagement with its respective screw 37 and follows the movement thereof, whereupon, upon moving out of engagement with the disc 95, which then becomes seated against the open end of bore 71 and passageway 76, cylinder air is permitted to discharge by flowing through the center of the stem and out the bores 93, annular passageway 77, bore 79, and cup 80. Movement of stem 84 to the wide open position shown in valve 61 in Figure 4 permits rapid exhaustion of air on the side of the piston opposite from the pressure side so that said piston is free to move in the one direction for actuating the tie rod 20, the disc 95 being held in positive engagement with its seat by spring 97 and by air pressure in the chamber 72. Lesser movement of stem 84 throttles the release of air and retards the rate of pressure drop in the exhausting end of the cylinder.

The amount of relative pivotal rotation of the pitman arms 24 and 25 is controlled by the amount of distortion remaining available to rubber plugs 39 after the desired preloading adjustment of screws 43 in the lugs 42, and, as seen in Figure 5, a small amount of relative rotation of the arms will move the arms from one limit of rotation to the other, one of the valves 60 and 61 being moved from fully open to fully closed position by the relative rotation of the arms in one direction. Therefore, a small amount of rotation of the steering wheel 11 will immediately cause operation of the valves and effect power actuation of the steering mechanism in a follow-up movement. When the steering wheel is rotated for negotiating a curve, one valve is opened, as shown in Figure 4, and as long as manual turning effort is applied to the steering wheel the open valve will remain in such position that air pressure is applied to one side of the servo-motor piston to continue to turn the wheels. However, as soon as manual turning force on the steering wheel ceases, and it is backed off slightly, the arms 24 and 25 return to their Figure 5 position whereby the valve stems 84 assume a neutral position. In the neutral position, the exhaust ports 94 are closed and each of the discs 95 is held slightly off its seat of inlet port 75 whereby air pressure is present in both conduits 57 and 58 and equilibrium is maintained in the system to hold the wheels in a steady, non-oscillatory position. In the neutral position, each of the valve discs 95 is open with respect to its inlet port 75 to approximately the extent of the valve 60 shown in Figure 3. The position of the valve stems in Figure 4 indicates that a twisting force is being applied to the steering wheel whereby the disc 95 in valve 60 is fully open to communicate supply pressure to one end of cylinder 47 and the disc in valve 61 is seated to prevent communication of supply pressure to the opposite end of the cylinder.

When the steering wheel 11 is turned in a clockwise direction, the shaft 13 rotates in a counterclockwise direction, as viewed in Fig. 1, causing the arms 24 and 25 to rotate in a counterclockwise direction. Due to resistance of the vehicle ground engaging wheel, the jointed pitman 16 will "break" so that the arm 24 will continue to rotate in a counterclockwise direction and will compress the rubber member 39 on the left-hand side of the arm structure, as viewed in Fig. 1. This movement of the arm 24 will cause the lug 35 to move against the ball 86 on the valve stem 84 of valve 61 whereby pressure will flow through conduit 58 to the right-hand side of the cylinder 47, while fluid pressure in the opposite end of the cylinder 47 will be vented to atmosphere through conduit 57 and valve 60. The piston rod 54 will thus move to the right and cause the vehicle wheels to turn to the right. Such movement will cause the draglink 15 to be moved rearwardly and will, of course, also swing arm 25 in a counterclockwise direction. The valves 60 and 61 and the position of the screws 37 are adjusted so that the valve actuation is slightly ahead of the draglink movement, and thus the piston and cylinder movement actually does the steering and the draglink merely follows this movement. Therefore, as soon as the vehicle driver stops turning the steering wheel 11, the valves immediately return to their neutral position wherein pressure is being supplied to both sides of the piston. The amount of force or torque required to turn the ground engaging wheels, of course, determines the amount the valves will be opened or actuated so that when higher turning forces are required, more force for steering will be provided.

When it is desired to turn the vehicle to the left, the steering wheel is turned in a counterclockwise direction, thus causing the shaft 13 and the pitman arms 24 and 25 to move in a clockwise direction, in the same manner as previously described. The pitman 16 will "break" and the pitman arm 24 will continue to rotate in a clockwise direction and will compress the rubber member 39 adjacent the right-hand side of the pitman arm, causing the lug 35 to push against the valve stem of valve 60 so that air under pressure will flow through conduit 57 to the left-hand end of cylinder 47. Simultaneously, the valve stem 84 in the valve 61 will move to the right, as viewed in Fig. 1 to connect the right-hand side of the cylinder 47 and conduit 58 with exhaust or atmosphere so that the piston rod will move to the right, as viewed in Fig. 1, to cause the vehicle wheels to steer to the left. If the ground engaging wheels strike an abutment so as to tend to turn them in one direction or the other, such turning forces will be dampened in the cylinder 47, because of air pressure on both sides of the piston. Under extreme conditions, a reaction to the pitman, through the draglink, might occur, and such reaction might actuate valve 60 or 61 to power steer the wheels back to their normal undeflected position. If the air system should fail, the vehicle ground wheels can be steered in the normal manual manner, through the draglink 15. The piston and cylinder 47 will not interfere with such manual steering because there would be no air pressure in cylinder 47. The lost-motion connection between pitman arms 24 and 25, which would occur while the rubber blocks 39 were being fully compressed, would occur during such manual steering occasioned by failure of the power steering system, but the vehicle would still be safely steered.

The present invention thereby provides an improved power steering apparatus for vehicles or boats which is simplified in structure and positive in operation. The power actuating system and valve means therefor may be readily applied to existing vehicles or boats by installing an articulated pitman or quadrant in the place of the usual pitman or quadrant and installing the power mechanism. In operation, the follow-up response is as positive as that obtained by hydraulic systems without the attendant disadvantages.

When maximum power assistance is needed, as in parking a vehicle, the pressure regulating valve 70 may be turned to provide full pressure in the system and when little or no power assistance is desired, as in driving on an icy road, the pressure may be materially reduced or turned off entirely. In this way the highly desired feel of the road may be maintained under all driving conditions without sacrificing any of the advantages of full power assistance. When there is no pressure in the system the piston rod 54 moves freely in the cylinder 47 and offers no appreciable resistance to manual steering. The amount of preloading of rubber plugs 39 by screws 43 determines the manual steering force necessary to bring the power steering into operation and the pressure regulating valve 70 determines the magnitude of the power assistance which is available.

Having now described our invention and in what manner the same may be used, what we claim as new and desire to protect by Letters Patent is:

1. In a combined manual and fluid pressure operated power transmitting system, a pair of members connected together for limited lost motion movement and movement in unison, one of said members being connected with a control element and the other member being connected with a servo-motor power element, a pair of valve units on one of said members, servo-motor inlet ports in said valve units, valve discs adapted to seat on said ports, hollow valve stems in said valve units having open ends forming servo-motor outlet ports, each of said stems being slidable to seat against one of said valve discs and open one of said inlet ports after the outlet port in said stem is closed by said disc, and means holding the valve stems of both of said valve units in engagement with the other member for actuation by relative movement of said pair of members, said members having a neutral relative position wherein each of said valve stems are seated against said valve discs and each of said valve discs are not seated on said inlet ports whereby both of said outlet ports are closed and both of said inlet ports are opened when said members are in said neutral position.

2. In a steering system, a steerable member, a servo-motor operatively connected to said steerable member, a manually rotatable shaft, a first arm operatively connected to said shaft so that rotation of said shaft causes rotation of said arm, a second arm pivotally connected between said first arm and said steerable member, rubber abutment means confined in bores in one of said arms, projections on said other arm for engaging said abutment means, said rubber abutment means being maintained normally in compressed condition and being further compressed by said projections to provide limited relative rotation of said two arms by manual steering efforts, valve means on one of said arms for controlling said servo-motor, and actuating means for said valve means on the other of said arms.

3. In a combined manual and servo-motor operated steering mechanism, a pair of members connected together for limited lost motion movement and movement in unison, a pair of bores in one of said members, distortable rubber plugs confined in said bores, abutment screws on the other member holding said plugs normally in compressed condition, said screws and plugs transmitting manual steering effort from one of said members to the other with slight lost motion by increasing the compression on one plug and decreasing the compression of the other plug, valve means for said servo-motor on one of said members and actuating means for said valve means on the other member.

References Cited in the file of this patent

UNITED STATES PATENTS

| | | |
|---|---|---|
| 1,385,658 | Blasiar | July 26, 1921 |
| 1,855,386 | Doolittle | Apr. 26, 1932 |
| 2,050,421 | Charles | Aug. 11, 1936 |
| 2,062,485 | Turek | Dec. 1, 1936 |
| 2,366,908 | Jenkins | Jan. 9, 1945 |
| 2,415,128 | Eaton | Feb. 4, 1947 |
| 2,565,929 | Onde | Aug. 28, 1951 |
| 2,635,582 | Zeilman | Apr. 21, 1953 |
| 2,682,929 | Almond | July 6, 1954 |

FOREIGN PATENTS

| | | |
|---|---|---|
| 758,143 | France | Oct. 23, 1933 |
| 570,069 | Great Britain | June 21, 1945 |